United States Patent
Nobes et al.

(10) Patent No.: US 11,827,397 B2
(45) Date of Patent: Nov. 28, 2023

(54) MULTILAYER PAPERBOARD POUCH AND METHOD OF MAKING THE SAME USING CONVENTIONAL BAG-MAKING EQUIPMENT (CBME)

(71) Applicant: Pactiv Evergreen Inc., Lake Forest, IL (US)

(72) Inventors: Geoffrey Nobes, Collierville, TN (US); Ernest Pasteur, Bartlett, TN (US)

(73) Assignee: EVERGREEN PACKAGING LLC, Memphis, TN (US)

( * ) Notice: Subject to any disclaimer, the term of this patent is extended or adjusted under 35 U.S.C. 154(b) by 8 days.

(21) Appl. No.: 17/350,424

(22) Filed: Jun. 17, 2021

(65) Prior Publication Data
US 2022/0402636 A1 Dec. 22, 2022

(51) Int. Cl.
*B65B 3/02* (2006.01)
*B65B 3/04* (2006.01)
(Continued)

(52) U.S. Cl.
CPC .................. *B65B 3/02* (2013.01); *B65B 3/04* (2013.01); *B65B 9/06* (2013.01); *B65B 51/26* (2013.01);
(Continued)

(58) Field of Classification Search
CPC .... B65B 3/02; B65B 3/04; B65B 9/06; B65B 51/26; B65B 61/06; B65D 75/5805;
(Continued)

(56) References Cited

U.S. PATENT DOCUMENTS 5,465,842 A 11/1995 Utley
5,830,118 A * 11/1998 Nicholson ............. B31B 70/142
383/122

(Continued)

FOREIGN PATENT DOCUMENTS

GB 2409186 A * 6/2005 ............. B31B 19/36
WO WO-2022191833 A1 * 9/2022 ......... B65D 75/5805

OTHER PUBLICATIONS

International Search Report and Written Opinion of the International Searching Authority or the Declaration; dated Jun. 25, 2018; 8 pages.

*Primary Examiner* — Thomas M Wittenschlaeger
(74) *Attorney, Agent, or Firm* — Baker Botts L.L.P.

(57) ABSTRACT

An improved paperboard pouch comprising a multilayer substrate and a method of making the same is provided. The multilayer paperboard pouch comprises an outer surface and an inner surface, wherein one of the surfaces is defined as a food contact surface. In the depicted embodiment, the properties of the polymer layer are chosen to provide adequate mechanical and barrier protection to the paper-based pouch formed on the conventional pouch-forming equipment. A method of manufacturing a multilayer paperboard pouch using conventional bag-making equipment ("CBME") running at normal production speed for making standard plastic pouches is also provided. First, a paper is extrusion-coated and then the CBME is configured with a feeder for feeding an extrusion-coated paper intermittently for a length along a feeding path; a cutter disposed at a position predetermined for cutting one of the layers of the coated paper and forming a first side gusset, a second side gusset and a bottom gusset portions and for folding each of a first side gusset, a second side gusset and a bottom gusset portions into halves along a center line extending longitudinally thereof; and a sealer for sealing the layers of the polymer with the layers of the
(Continued)

bottom gusset portion and the layers of the first and second gusset portions, respectively to form the finished multilayer paperboard pouch ready for sale and distribution to various retailers. It is to be noted that in the depicted embodiment various closure constructions and mechanism can be used for heat sealing the finished pouches.

24 Claims, 7 Drawing Sheets

(51) Int. Cl.
    *B65B 9/06*     (2012.01)
    *B65B 61/06*     (2006.01)
    *B65B 51/26*     (2006.01)
    *D21H 19/30*     (2006.01)
    *D21H 19/82*     (2006.01)
    *D21H 27/10*     (2006.01)
    *D21H 19/22*     (2006.01)
    *B65D 75/58*     (2006.01)

(52) U.S. Cl.
    CPC ............ *B65B 61/06* (2013.01); *D21H 19/22* (2013.01); *D21H 19/30* (2013.01); *D21H 19/824* (2013.01); *D21H 27/10* (2013.01); *B65D 75/5805* (2013.01); *B65D 75/5883* (2013.01)

(58) Field of Classification Search
    CPC .... B65D 75/5883; D21H 19/22; D21H 19/30; D21H 19/824; D21H 27/10
    See application file for complete search history.

(56) References Cited

U.S. PATENT DOCUMENTS

| | | |
|---|---|---|
| 6,149,993 A | 11/2000 | Parks et al. |
| 7,229,678 B2 | 6/2007 | Reighard et al. |
| 2003/0180489 A1 | 9/2003 | Reighard et al. |
| 2004/0025476 A1* | 2/2004 | Oliverio ................ B65B 9/087 53/550 |
| 2004/0209021 A1 | 10/2004 | Shih |
| 2007/0116929 A1 | 5/2007 | Fujimori |
| 2013/0040155 A1 | 2/2013 | Knauf |
| 2018/0251944 A1* | 9/2018 | Nobes ................... D21H 19/60 |

\* cited by examiner

MULTILAYER PAPERBOARD POUCH AND METHOD OF MAKING THE SAME USING CONVENTIONAL BAG-MAKING EQUIPMENT (CBME)

FIELD OF THE DISCLOSURE

The present disclosure relates to sustainable alternatives for flexible packaging used in the food industry. More particularly, the present disclosure is directed to a paperboard pouch or paper bag and a method for manufacturing the same using conventional bag-making equipment that addresses the shortcomings of currently available packaging products.

BACKGROUND OF THE INVENTION

Packaging foods with the right amount of protection from the surrounding environment is extremely important in the retail consumer food industry. Various paper-based pouches and bags have been developed and most prior art pouches and packaging are primarily made of paper-based materials lacking inherent extensibility and ideally not considered suitable for flexible packaging of food products. The very cellulosic materials used to manufacture these paper-based pouches are also susceptible to environmental contamination that weakens their internal structure bonding and thereby make such pouches and packaging highly inefficient and uneconomical for extended use and storage.

In addition, certain kinds of foods like nuts, granola, pet foods and especially liquids, are susceptible to oxygen or other gases that cause them to spoil, degrade or change flavor. The flexible pouch or packaging that will be used to store the food will ideally need good oxygen- and moisture-barrier properties to protect its contents. Even though attempts have been made to make these pouches flexible for all sorts of applications, the need to meet demanding performance criteria, depending on the specific application has created a need for sustainable alternatives for flexible packaging in place of the plastic laminate materials currently used in the market. Thus, there exists a need for multilayer paperboard pouches used for providing food to consumers in a flexible pouch or packaging.

Additionally, the use of flexible packaging for the marketing and distribution of various items, including foodstuffs, has become more and more prevalent. Current flexible packaging is typical in the form of a formed, filled and sealed reclosable polymeric package. Such packages are typically outfitted with one or more closure types (such as a press to seal or zipper-slider type closure), and may also have tamper-evident features.

In a typical case, such packages are made on bag-making machines that utilize a web of polymeric film, such as low-density polyethylene and blends thereof, wherein the web is "V-folded" to form a bottom, the folded web is then fed into a bag-making machine that applies a closure to the top opening and seals across the web at predetermined distances in order to form the side seals of the discrete packages. It is to be further noted that various functionalities may also be provided within the CBME to optionally fill the package with an item to be sold, seal the package and cut the packages with tear notches, along the side seals to produce discrete formed, filled and sealed packages. Other package-making methods may include feeding two webs of polymeric material and sealing the top of the package, creating side seals, and filling through the bottom before sealing the bottom of the package. Other pouch-forming methods may include feeding three different or similar webs. For instance, two polymeric-coated paper webs can be utilized for the side walls and a clear polymeric material can be utilized for the gusset. Other methods may include forming a gusset bottom on the packages.

Drawbacks of the above-described packages include the use of plastics and potential environmental impacts of the same. A need, therefore, exists for a suitable paper-based substrate that is capable of being run on conventional polymeric bag-making equipment.

Therefore, there is a need to develop a sustainable alternative in the food-packaging industry. More particularly, there is a market need for an improved paperboard pouch or packaging that can be manufactured, printed and filled using conventional equipment designed for making standard polymeric bags.

BRIEF SUMMARY OF THE INVENTION

It is the object of this invention to provide a multilayer paperboard pouch or paper bag and a method for producing the same using conventional bag-making equipment running at normal production speed and suitable for mass bag production.

In general, bag-making machines or conventional bag-making equipment ("CBME") come in various configurations and options, and are frequently customized, making them an ideal machine for the production of large quantities of paper and plastic bags. In one aspect of the present disclosure, a CBME is used to produce a pouch by passing a roll of paper through a series of operations like feeding, cutting and stacking, as disclosed in U.S. Pat. No. 6,293,896. It is to be noted that various methods of manufacturing reclosable bags that have been previously disclosed in U.S. Pat. No. 6,293,896 titled Methods of Manufacturing Reclosable Package Having a Slider Device, are hereby incorporated by reference in their entirety.

In addition to the foregoing, one of the key aspects of the present invention is the novel concept of applying layers of polymers to one or both sides of paper by extrusion coating and thereby creating a suitable, non-extensible substrate which can be used to reliably produce flexible multilayer paper-based pouches using a CBME running at normal production speeds. It is to be noted that normal production speed in the context of bag-making equipment refers in general to the speed at which conventional bag-making equipment is designed to process polymer bags according to such equipment's manufacturer's specifications. For example, standard manufacturing processes using at least 2 lanes of bag producing machines are designed to produce bags in the range of 100-600 bags per minute. Such manufacturer's specifications would be known to a person having ordinary skill in the consumer bag-making art.

Flexible paper-based pouches formed using a CBME can further include a first side gusset portion disposed between and extending along first side edges, a second side gusset portion disposed between and extending along second side edges and a bottom gusset portion disposed between and extending along the bottom side edges. The steps of producing flexible paper-based pouches using a CBME can be further integrated with activities such as printing, cutting, vertical form filling and sealing to provide the finished multilayer paperboard pouches. For example, in a typical bag production machine the bottom seal and the two side seals are formed before the pouch contents are filled and once the pouch is filled the top seal is completed. By way of example and not of limitation, various fitments, zippers, etc. are typically added as part of the top seal process.

In one aspect of the present disclosure, a paperboard pouch comprising a multilayer substrate is provided. In the depicted embodiment, the multilayer paperboard pouch comprises an outer surface and an inner surface, wherein one of the surfaces is defined as a food contact surface. By way of example and not limitation, the properties of the polymer-coated layer are chosen to provide adequate mechanical and barrier protection to the paper-based pouch formed on the CBME.

In an aspect of the present disclosure, a paper is extrusion coated with the thermoplastic layers using extrusion-coating equipment. In the depicted embodiment, the extrusion-coating equipment converts solid thermoplastic polymer into a melt at the appropriate temperature required for extrusion coating to form a suitable and non-extensible polymer-coated laminate substrate for later use in a conventional CBME to form pouches and/or bags.

In another aspect of the present disclosure, a method for producing single and multilayer paperboard pouches and/or bags using a CBME running at normal production speed is provided. First, the CBME having a feeder for feeding a polymer-coated laminated paper intermittently for a length along a feeding path; a cutter disposed at a position predetermined for cutting one of the layers of the coated paper and forming a first side gusset, a second side gusset and a bottom gusset portions and for folding each of the a first side gusset, a second side gusset and a bottom gusset portions into halves along a center line extending longitudinally thereof; and a sealer disposed downstream of the feeder for sealing layers of the first and second side gusset portions along said first and second side edges respectively, to form the finished multilayer paperboard pouch ready for sale and distribution to various retailers. It is to be noted that in the depicted embodiment various closure constructions and mechanism can be used for heat sealing the finished pouches. It is to be noted that the polymer-coated laminated paper comprises a plurality of polymer layers.

The references shown above in detail to the embodiments of the invention are provided by way of explanation of the invention, not limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in the following detailed description. It is to be understood by one of ordinary skill in the art that the present discussion is a description of exemplary embodiments only, and is not intended as limiting the broader aspects of the present invention, which broader aspects are embodied in the exemplary constructions.

BRIEF DESCRIPTION OF THE DRAWINGS

The disclosure will be more readily understood in view of the following description when accompanied by the below figures. The accompanying figures incorporated in and forming a part of the specification illustrate several aspects of the present invention and, together with the description, serve to explain the principles of the invention.

DETAILED DESCRIPTION OF THE INVENTION

Figure 1:
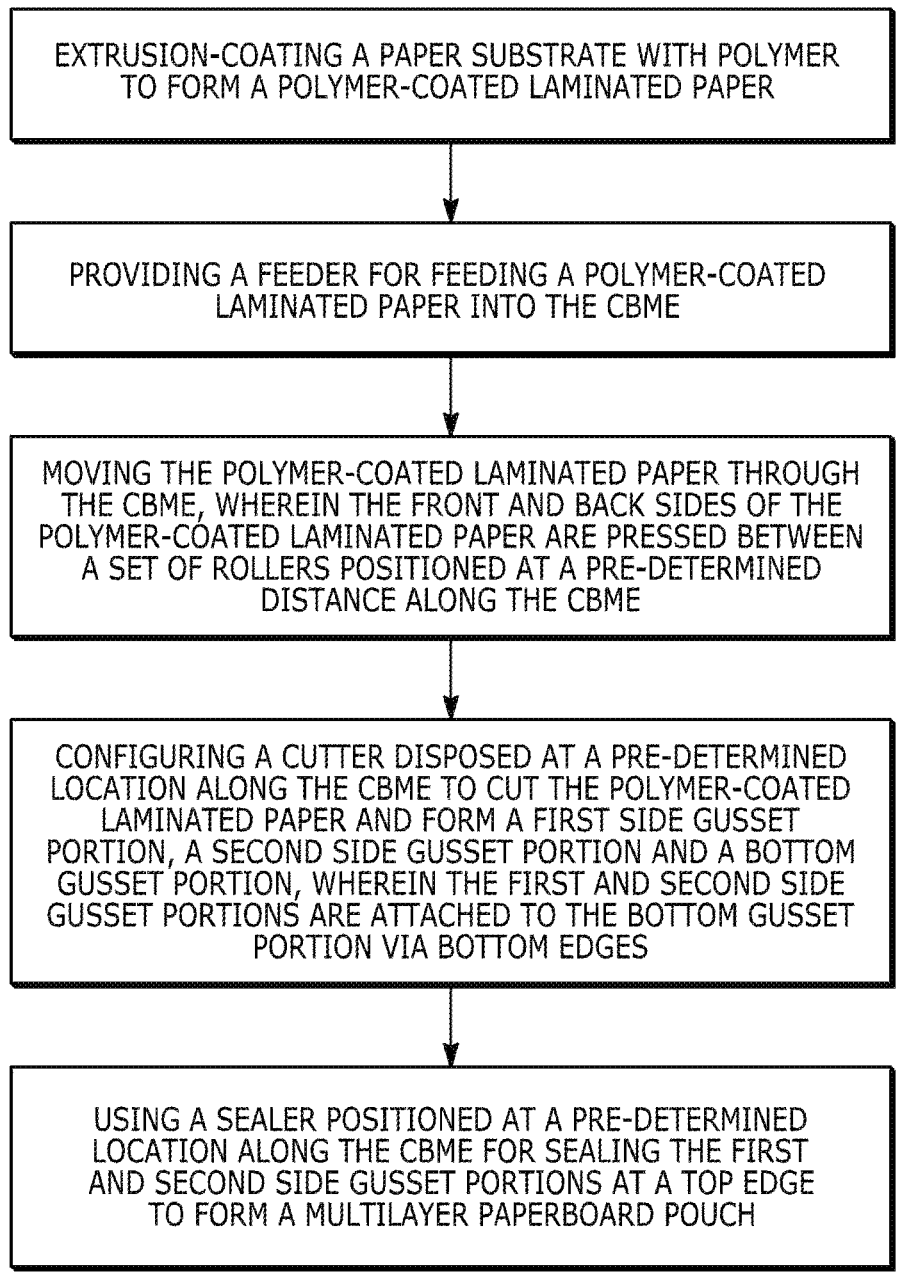
FIG. 1 is a flow-chart illustrating the steps of manufacturing an embodiment of a multilayer paperboard pouch using a CBME.

The following disclosure as a whole may be best understood by reference to the provided detailed description when read in conjunction with the accompanying drawings, drawing description, abstract, background, field of the disclosure and associated headings.

Identical reference numerals when found on different figures identify the same elements or a functionally equivalent element. The elements listed in the abstract are not referenced but nevertheless refer by association to the elements of the detailed description and associated disclosure.

In an aspect of the present disclosure, a paper is extrusion coated with the thermoplastic layers using extrusion-coating equipment. In the depicted embodiment, the extrusion-coating equipment converts the solid thermoplastic polymer into a melt at the appropriate temperature required for coating to form a suitable and non-extensible polymer-coated laminate substrate for later use in a conventional CBME to form pouches and/or bags.

In another aspect of the present disclosure, the process is designed to successively produce multilayer paperboard bags and pouches, using a CBME running at normal production speed. In the depicted embodiment, the multilayer paperboard bag/pouch further includes a first side gusset portion disposed between and extending along the first side edges, a second side gusset portion disposed between and extending along the second side edges and a bottom gusset portion disposed between and extending along the bottom edges. By way of example and not of limitation, the method of making the paperboard pouch using a CBME comprises first preparing a substrate and feeding the prepared substrate into the CBME configured to produce the paper-based pouch having an outer surface and an inner surface.

In the depicted embodiment, the CBME is configured with various pre-set operations—to produce the paperboard pouches—comprising: (1) configuring a feeder for feeding extrusion coated paper intermittently for a certain length along a feeding path; (2) configuring a cutter disposed at a pre-determined location along the CBME to cut the polymer layer and form a first side gusset portion, a second side gusset portion and a bottom gusset portion; wherein the first and second side gusset portions are attached to the bottom gusset portion via bottom edges; and (3) using a sealer disposed downstream of the feeder for sealing layers of the first and second side gusset portions along said first and second side edges, respectively, to form a multilayer paperboard pouch. By way of example and not of limitation, the sealer uses a heat-sealing process designed to effect the seal between the layers of polymers on the paper without causing any scorching or burning of the paper.

In another aspect of the present disclosure, a single-roll of the substrate used to make the paperboard pouch is folded in half such that the polymer-coated layer of the substrate faces the inside of the substrate and then fed into a CBME running at normal production speed. In the depicted embodiment, the process of making a multilayer paperboard pouch comprises the steps of: (1) feeding a web of a pre-printed roll of the substrate into the CBME while maintaining the material tension of the roll; (2) routing the web of pre-printed roll material through multiple rollers set at a pre-determined position along the feeding path of the CBME; (3) folding the web of the pre-printed roll in half such that the polymer-coated layer faces the inside of the pre-printed roll; (4) forming apertures for the sealing a gusset such that a "V" gusset is formed in the folded pre-printed roll; (5) feeding the folded web of pre-printed roll into the sealer; (6) sealing the closure components to opposite sides of the open web and across the web at a pre-determined distance to seal the sides of the pouch and gusset; and (7) cutting and stacking the finished pouches—thereby severing the finished paperboard pouches at pre-determined locations to form discrete pouches that are packaged and distributed to various retailers. It is to be further noted that pouches formed by the above processes can be further comprised of various types of resealable and reclosable closure mechanisms.

In another aspect of the present disclosure, the CBME can be further configured for horizontal and vertical filling operations configured to fill finished pouches by loading stacks of pouches into a feeder, wherein the feeder is further configured to: (1) segregate the individual pouches; (2) open the separated individual pouches; (3) fill the individual pouches to a pre-determined weight or volume; and (4) resealing the top of the individual pouch wherein each finished and filled individual pouch has a certain pre-determined burst strength and a side seal strength.

By way of example and not of limitation, some packaging machines may also be incorporated in the filling process—for example, boxes filled with the finished product and ready for shipment to distributors. The finished paperboard pouches are stacked and conveyed at the end of the machine. The finished paperboard pouches can be of varied configuration based on the bag design and the layout requirement.

It is to be noted that in the depicted embodiments described above, the coated paper used for the production of pouches can be produced using standard multilayer extrusion-coating equipment. One of the many novel aspects of the present invention is not having any requirement to make modifications to the extruders and dies for the production of the paper used to make pouches. By way of example and not limitation, the extrusion-coating line needs to have the appropriate tension control to process the thinner gauge/reduced caliper of lightweight paper compared to thicker paperboard that is used for the production of gable-top cartons (as shown in the table below):

TABLE A

| Name | Material | Burst (psi) | Side Seal (gf/in) | Tensile Strength (MD (MPa) | Tensile Strength (CD (MPa) | Elmen-dorf MD (grams) | Elmen-dorf CD (grams) | Puncture (Joules) |
|---|---|---|---|---|---|---|---|---|
| Paper Pouch | TS5 60# P1S 29# LDPE | 2.7 | 2000 | 45 | 15 | 80 | 94 | 0.004 |
| Bio Paper Pouch | TS5 60# P1S 29# bioLDPE | 2.7 | 2000 | 46 | 15 | 80 | 94 | 0.004 |
| Bio Barrier Paper Pouch | TS5, 60# P1S, 10# bioLDPE/1.5# Tie/5# Nylon/1.5# Tie/10# bioLDPE | 4.6 | 2800 | 39 | 15 | 84 | 102 | 0.007 |
| Bio Barrier Paper Pouch | TS5, 60# P1S, 10# bioLDPE/1.5# Tie/5# 15% Am Nylon/1.5# Tie/10# bioLDPE | 5.9 | 3000 | 39 | 16 | 86 | 104 | 0.006 |
| Bio Barrier Paper Pouch | TS5, 60# P1S, 2# bioLDPE/1.5# Tie/5# Nylon/1.5 # Tie/2 # bioLDPE/15# bioLDPE | 4.9 | 2800 | 40 | 16 | 70 | 83 | 0.005 |
| Bio Barrier Paper Pouch | TS5, 60# P1S, 2# 20% mPE-bioLDPE/1.5# Tie/5# Nylon/1.5# Tie/2# 20% mPE-bioLDPE/15# bioLDPE | 5 | 3300 | 40 | 16 | 79 | 102 | 0.005 |
| Bio Barrier Paper Pouch | TS5, 60# P1S, 2# bioLDPE/1.5# Tie/5# 15% Am Nylon/1.5# Tie/2# bioLDPE/15#bioLDPE | 5.3 | 3000 | 39 | 15 | 70 | 89 | 0.005 |
| Bio Barrier Paper Pouch | TS5, 60# P1S, 2# 20% mPE-bioLDPE/1.5# Tie/5# 15% Am Nylon/1.5# Tie/2# 20% mPE-bioLDPE/15# bioLDPE | 5.4 | 3200 | 39 | 15 | 93 | 116 | 0.005 |

TABLE A-continued

| Name | Material | Puncture Compressive load (Newtons) | Dart Drop (ft-lb) | OTR | WVTR | C1S Brightness | C1S Opacity | C1S Gloss |
|---|---|---|---|---|---|---|---|---|
| Paper Pouch | TS5 60# P1S 29# LDPE | 3.8 | 0.2 | | 5.1 | 72 | 94 | 59 |
| Bio Paper Pouch | TS5 60# P1S 29# bioLDPE | 3.6 | 0.2 | | | 72 | 94 | 59 |
| Bio Barrier Paper Pouch | TS5, 60# P1S, 10# bioLDPE/1.5# Tie/5# Nylon/1.5# Tie/10# bioLDPE | 4.1 | 0.4 | 115.56 | 6.25 | 72 | 94 | 59 |
| Bio Barrier Paper Pouch | TS5, 60# P1S, 10# bioLDPE/1.5# Tie/5# 15% Am Nylon/1.5# Tie/10# bioLDPE | 4.2 | 0.6 | 82.23 | 6.11 | 72 | 94 | 59 |
| Bio Barrier Paper Pouch | TS5, 60# P1S, 2# bioLDPE/1.5# Tie/5# Nylon/1.5 # Tie/2 # bioLDPE/15# bioLDPE | 4.6 | 0.4 | 121.38 | 7 | 72 | 94 | 59 |
| Bio Barrier Paper Pouch | TS5, 60# P1S, 2# 20% mPE-bioLDPE/1.5# Tie/5# Nylon/1.5# Tie/2# 20% mPE-bioLDPE/15# bioLDPE | 4.9 | 0.5 | 88.59 | 6.48 | 72 | 94 | 59 |
| Bio Barrier Paper Pouch | TS5, 60# P1S, 2# bioLDPE/1.5# Tie/5# 15% Am Nylon/1.5# Tie/2# bioLDPE/15#bioLDPE | 4.5 | 0.4 | 70.83 | 6.77 | 72 | 94 | 59 |
| Bio Barrier Paper Pouch | TS5, 60# P1S, 2# 20% mPE-bioLDPE/1.5# Tie/5# 15% Am Nylon/1.5# Tie/2# 20% mPE-bioLDPE/15# bioLDPE | 4.8 | 0.4 | 61.6 | 6.87 | 72 | 94 | 59 |

In another aspect of the present disclosure, the extrusion-coated paper provides a non-extensible substrate for converting into flexible packaging (i.e., pouches, bags, etc.) using conventional, commercial equipment typical of that used in the flexible packaging industry at normal production speed.

In another aspect of the present disclosure, the coat weight of the polymer-coated layer (or polymer layer thickness) is selected to provide the most optimum mechanical and barrier properties for processing the paperboard pouches on conventional pouch-forming equipment and to adequately protect the contents for the required shelf life.

In another aspect of the present disclosure, a method for manufacturing an extrusion-coated paper substrate is provided, the method comprising the steps of: (1) extruding polymer resin(s) from a slot die directly onto the moving paper web; (2) passing the paper web through a nip consisting of a rubber-covered pressure roller and a chrome-plated chill roll wherein the chill roll further cools the molten polymer back into the solid state and imparts the desired finish to the plastic surface. By way of example and not of limitation, the extrusion-coated paper substrate of the invention can be comprised of a single polymer (e.g., LDPE) or multiple polymers (e.g., polyamide, tie resin, LDPE). It is to be further noted that in extrusion-coated paper substrate comprising multiple polymers, the extrusion coating step (i.e., coextrusion) utilizes two, or more, extruders in combination with a single slot die in which the individually extruded polymers are extruded as a multilayer film.

Figure 7:
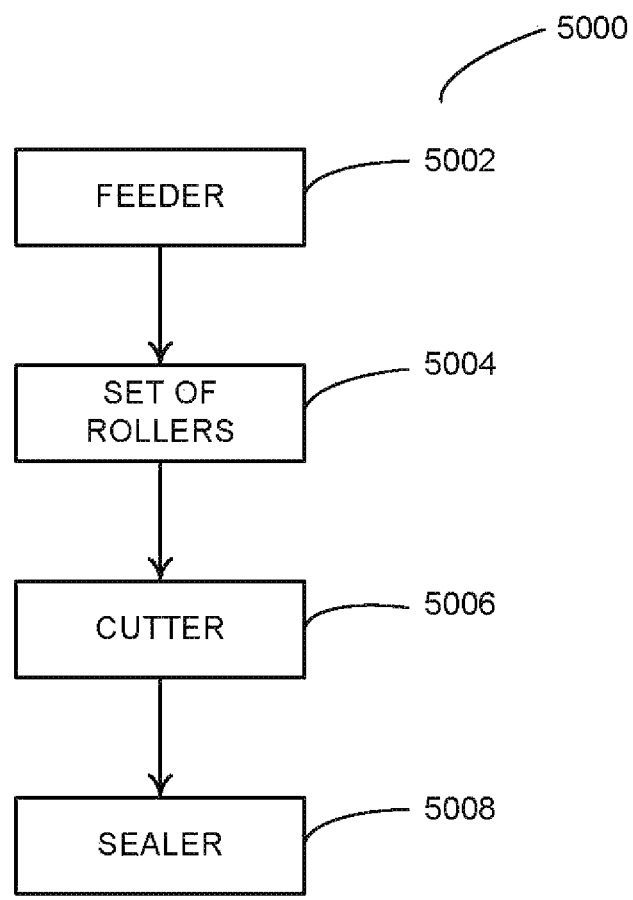
FIG. 7 illustrates the feeder, set of rollers, cutter and sealer used for the steps of manufacturing an embodiment of a multilayer paperboard pouch using a CBME.

FIG. 1 is a flow chart illustrating the steps of manufacturing an embodiment of a multilayer paperboard pouch using conventional bag-making equipment ("CBME"). As illustrated in FIG. 1, the CBME configured to produce the paperboard pouches running at normal production speed is further comprised of: (1) extrusion-coating a paper substrate with a polymer to form a polymer-coated laminated paper; (2) providing a feeder 5002 (shown in FIG. 7) for feeding a polymer-coated laminated paper into the CBME; (3) moving the polymer-coated laminated paper through the CBME, wherein the front and back sides of the polymer-coated laminated paper are pressed between a set of rollers 5004 (shown in FIG. 7) positioned at a pre-determined distance along the CBME; (4) configuring a cutter 5006 (shown in FIG. 7) disposed at a pre-determined location along the CBME to cut the polymer-coated laminated paper and form a first side gusset portion, a second side gusset portion and a bottom gusset portion, wherein the first and second side gusset portions are attached to the bottom gusset portion via bottom edges; and (5) using a sealer 5008 (shown in FIG. 7) positioned at a pre-determined location along the CBME for sealing the first and second side gusset portions at a top edge to form a multilayer paperboard pouch. Finally, the formed paperboard pouches are severed at pre-determined locations to form discrete pouches that are packaged and distributed to various retailers. The table below illustrates the various sizes, capacities, dimensions and the corresponding weights of an embodiment of a multilayer paperboard pouch produced following the steps outlined in FIG. 1 and using a CBME running at a normal production speed.

| Size (grams) | Size (ounce) (oz) | Width (mm) | Width (inch) | Length (mm) | Length (inch) | Bottom Gusset (mm) | Bottom Gusset (inch) |
|---|---|---|---|---|---|---|---|
| 28 | 1 | 80 | 3.15 | 130 | 5.10 | 50 | 1.95 |
| 70 | 2 | 110 | 4.35 | 170 | 6.70 | 70 | 2.75 |
| 100 | 3 | 120 | 4.75 | 200 | 7.90 | 80 | 3.15 |
| 150 | 4 | 130 | 5.10 | 210 | 8.25 | 80 | 3.15 |
| 250 | 8 | 160 | 6.30 | 230 | 9.05 | 90 | 3.35 |
| 500 | 16 | 190 | 7.50 | 265 | 10.40 | 100 | 3.95 |
| 750 | 27 | 210 | 8.25 | 310 | 12.20 | 55 | 2.1 |
| 1000 | 32 | 235 | 9.25 | 335 | 13.20 | 110 | 4.35 |
| 3000 | 106 | 300 | 11.8 | 500 | 19.70 | 150 | 5.90 |
| 5000 | 176 | 380 | 14.9 | 550 | 21.70 | 190 | 7.50 |

Figure 2:
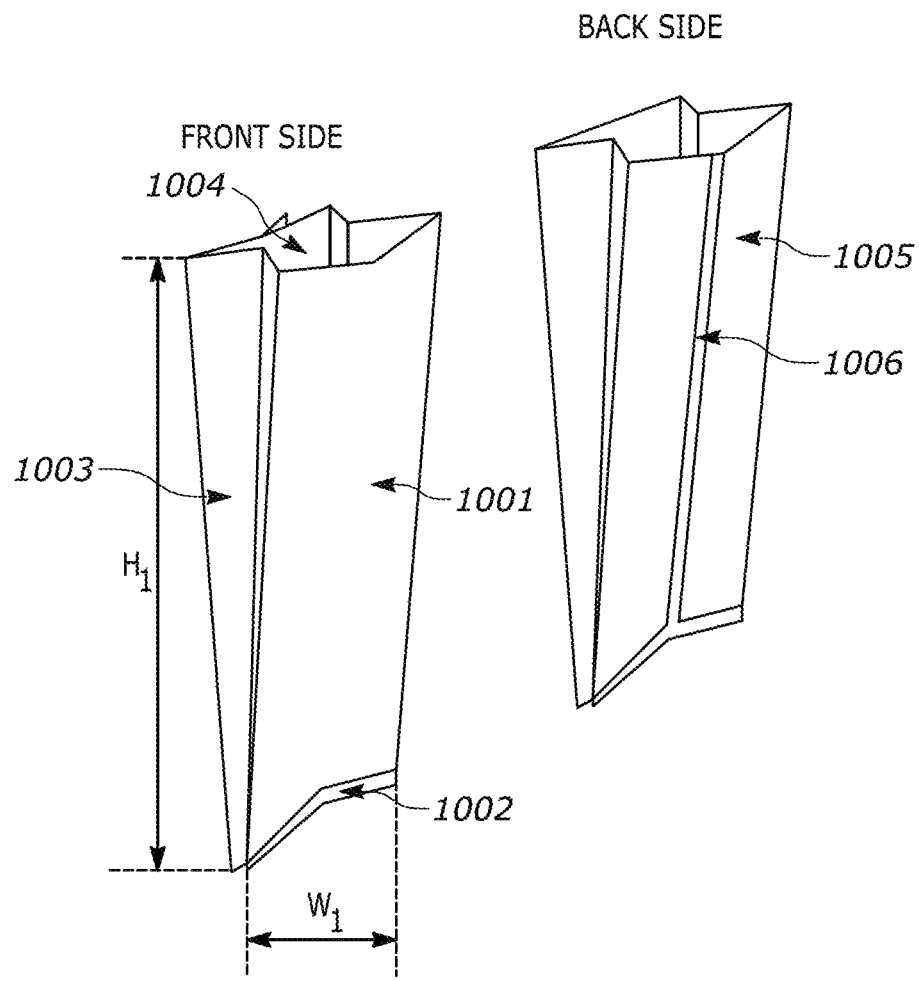
FIG. 2 illustrates a schematic view and a table showing dimensions of an embodiment of a multilayer paperboard flat-bottom pouch produced using a CBME running at a normal production speed.

FIG. 2 illustrates a schematic view and a table showing dimensions of an embodiment of a multilayer paperboard flat-bottom pouch produced using a CBME running at a normal production speed. As illustrated in FIG. 2, the multilayer paperboard flat-bottom pouch is comprised of a front side 1001, a back side 1005, an open top 1004, a side gusset 1003, a bottom gusset 1002 and a central seal area 1006. By way of example and not limitation, in the depicted embodiment of the pouch, the side gusset 1003 has a pre-determined length and width of seven and three inches, respectively and the bottom gusset 1002 has a pre-determined length and width of three and four inches, respectively. The table below illustrates various sizes and weights of flat-bottom pouches an embodiment of a multilayer paperboard flat-bottom pouch as shown in FIG. 2 and produced using a CBME running at a normal production speed.

| Size (grams) | Size (ounce) (oz) | Width (mm) | Width (inch) | Length (mm) | Length (inch) | Side Gusset (mm) | Side Gusset (inch) |
|---|---|---|---|---|---|---|---|
| 250 | 8 | 80 | 3.15 | 260 | 10.236 | 50 | 1.96 |
| 500 | 16 | 85 | 3.35 | 360 | 14.17 | 60 | 2.36 |
| 1000 | 32 | 135 | 5.31 | 390 | 15.35 | 90 | 3.54 |

Figure 3:
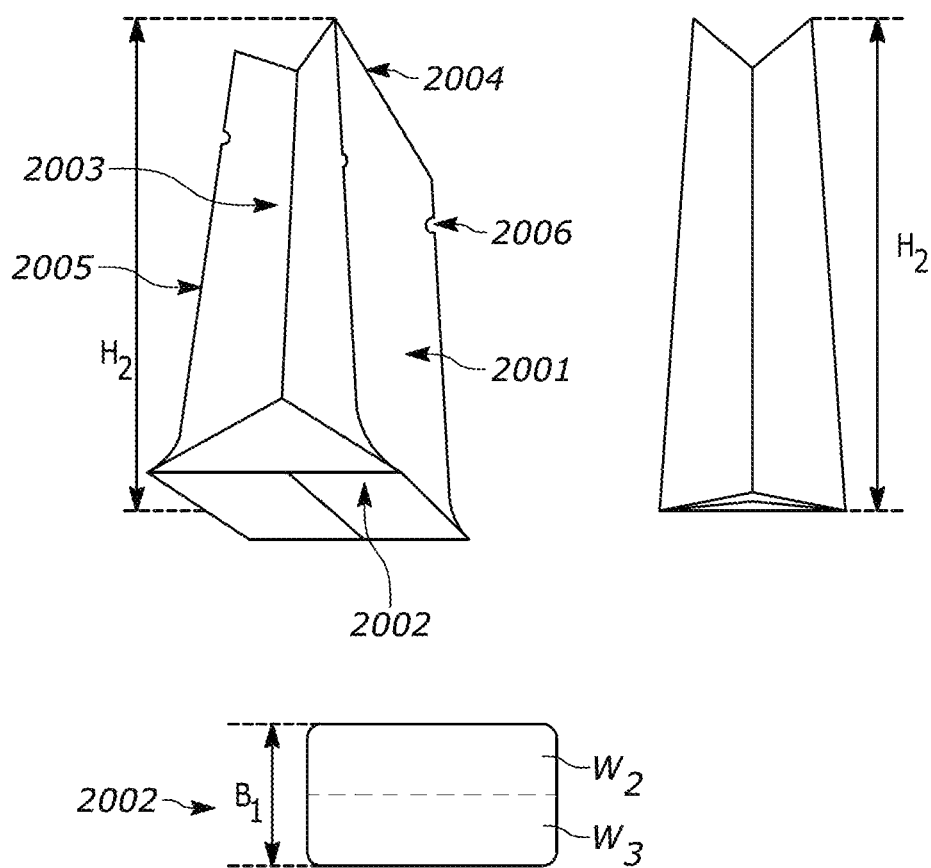
FIG. 3 illustrates a schematic view and a table showing dimensions of an embodiment of a multilayer paperboard flat-bottom pouch without a zipper.

FIG. 3 illustrates a schematic view of an embodiment of a multilayer paperboard flat-bottom pouch without a zipper. As illustrated in FIG. 3, the multilayer paperboard flat-bottom pouch comprises a front side 2001, a back side 2005, an open top 2004, a side gusset 2003, a bottom seal area forming the bottom gusset 2002 and a tear notch 2006 positioned proximate to the open top 2004 of the flat-bottom pouch.

By way of example and not limitation, in the depicted embodiment of the pouch without a zipper—as illustrated in FIG. 3—the side gusset 2003 having a height of seven inches (H2) is located at an equidistant length of one point five inches from the front side 2001 and the back side 2005 of the pouch. In addition, the bottom gusset 2002 forming the bottom seal area has a pre-determined length and width of three and four inches, respectively. The table below illustrates various sizes and weights of flat-bottom pouches an embodiment of a multilayer paperboard flat-bottom pouch as shown in FIG. 3 and produced using a CBME running at a normal production speed.

| Flat-Bottom Pouch without Zipper | | | | | | | | | |
|---|---|---|---|---|---|---|---|---|---|
| Size (grams) | Size (ounce) (oz) | Width (mm) | Width (inch) | Length (mm) | Length (inch) | Side Gusset (mm) | Side Gusset (inch) | Bottom Gusset (mm) | Bottom Gusset (inch) |
| 113 | 3 | 95 | 3.7 | 185 | 7.2 | 30 + 30 = 60 | 2.3 | 30 + 30 = 60 | 2.3 |
| 250 | 8 | 95 | 3.7 | 230 | 9 | 35 + 35 = 70 | 2.7 | 35 + 35 = 70 | 2.7 |
| 340 | 11 | 100 | 3.9 | 270 | 10.6 | 35 + 35 = 70 | 2.7 | 35 + 35 = 70 | 2.7 |
| 500 | 16 | 110 | 4 | 280 | 11 | 40 + 40 = 80 | 3.1 | 40 + 40 = 80 | 3.1 |
| 1 KG | 32 | 140 | 5.5 | 350 | 13.7 | 47.5 + 47.5 = 95 | 3.7 | 47.5 + 47.5 = 95 | 3.7 |
| Flat-Bottom Pouch without Zipper | | | | | | | | | |

Figure 4:
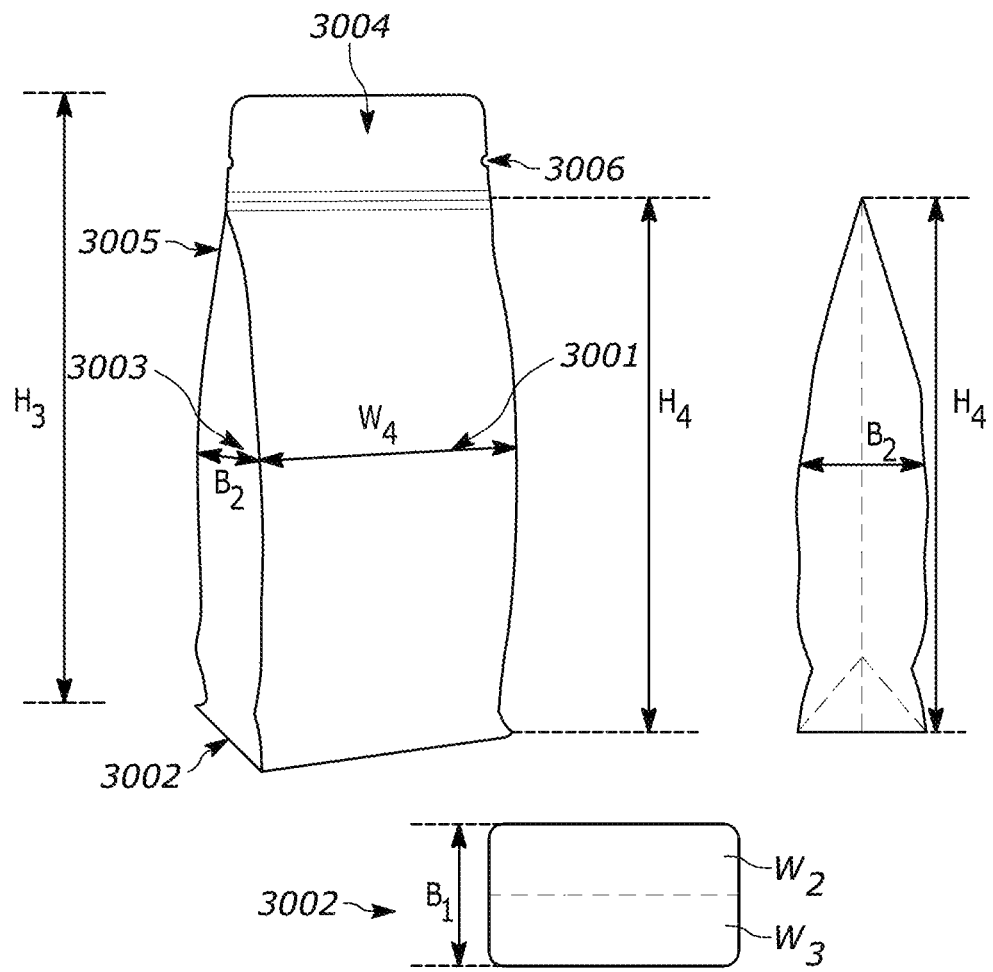
FIG. 4 illustrates a schematic view and a table showing dimensions of an embodiment of a multilayer paperboard flat-bottom pouch having a zipper.
Figure 5:
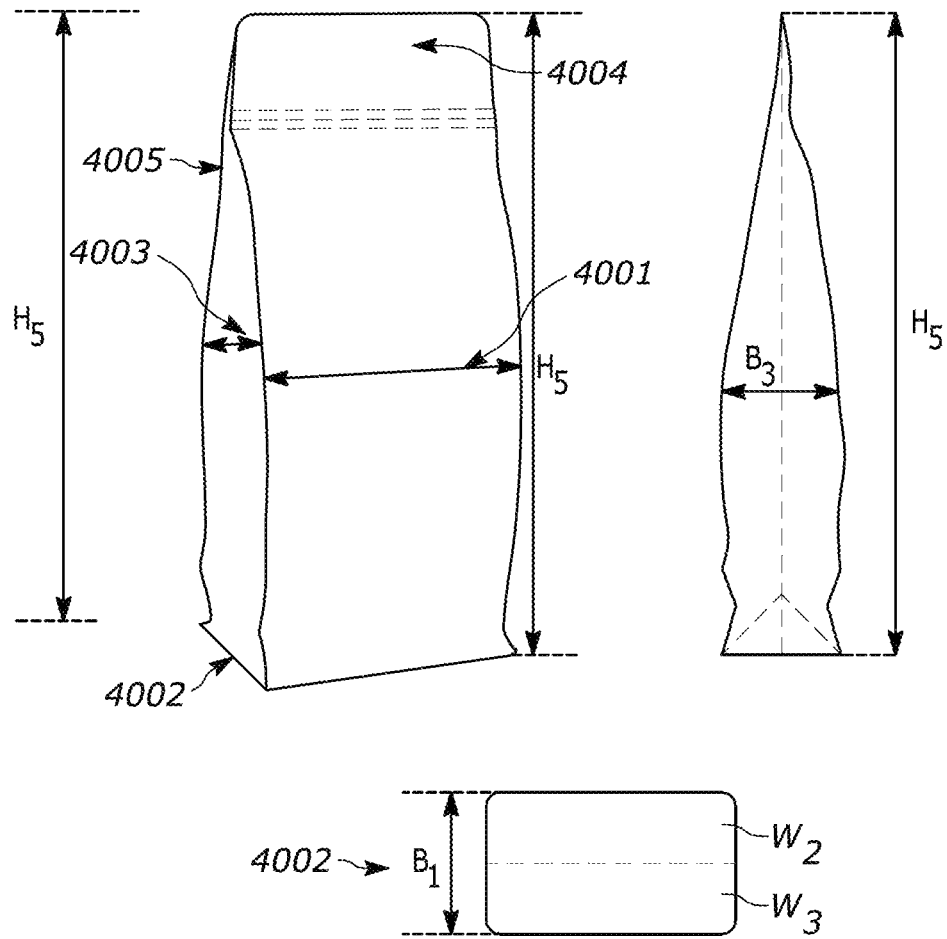
FIG. 5 illustrates a schematic view and a table showing dimensions of an embodiment of a multilayer paperboard flat-bottom pouch having a tear-off zipper.

FIG. 4 illustrates a schematic view of an embodiment of a multilayer paperboard flat-bottom pouch with a zipper. As illustrated in FIG. 5, the multilayer paperboard flat-bottom pouch comprises a front side 3001, a back side 3005, an open top 3004, a side gusset 3003, a bottom seal area forming the bottom gusset 3002 and a tear notch 3006 positioned proximate to the open top 3004 of the flat-bottom pouch. By way of example and not limitation, in the depicted embodiment of the pouch, the side gusset 3003 having a height of seven inches is located at an equidistant length of one point five inches from the front side 3001 and the back side 3005 of the pouch. In addition the bottom gusset 3002 forming the bottom seal area has a pre-determined length and width of three and four inches, respectively. It is to be further noted that in the depicted embodiment of the multilayer pouch with the zipper, the tear notch 3006 is positioned in proximity to the open top 3004 and is formed at a pre-determined height of six inches from the bottom seal area/bottom gusset 3002.

FIG. 5 primarily illustrates a multilayer paperboard flat-bottom pouch with a tear-off zipper and having the same configuration and dimension of the embodiment illustrated in FIGS. 3 and 4. As illustrated in FIG. 5, the multilayer paperboard flat-bottom pouch comprises a front side 4001, a back side 4005, an open top 4004, a side gusset 4003, a bottom seal area forming the bottom gusset 4002 and a tear notch 4006 positioned proximate to the open top 4004 of the flat-bottom pouch. The tables below illustrate the various sizes and weights of flat-bottom pouches produced using a CBME running at a normal production speed.

| Pouch Capacity Based on Volume of Water | | | | | | |
|---|---|---|---|---|---|---|
| Size (ml) | Width (mm) | Width (inch) | Length (mm) | Length (inch) | Bottom Gusset (mm) | Bottom Gusset (inch) |
| 100 ml | 100 | 3.93 | 140 | 5.51 | 30 | 1.18 |
| 200 ml | 110 | 4.33 | 170 | 6.69 | 70 | 2.75 |
| 350 ml | 120 | 4.72 | 200 | 7.87 | 80 | 3.14 |
| 500 ml | 140 | 5.51 | 210 | 8.26 | 80 | 3.14 |
| 750 ml | 160 | 6.29 | 230 | 9.05 | 90 | 3.54 |
| 1 ltr | 190 | 7.48 | 265 | 10.43 | 100 | 3.93 |

In an aspect of the present disclosure as illustrated in the Figures, the extrusion-coated paper for the improved pouch can be of any basis weight practical for a given application. By way of example and not limitation, basis weights are in the range of 27 to 100 lbs/3,000 ft$^2$. By way of example and not limitation, for coated paper a low range of 27 to 30 lbs/3,000 ft$^2$ range is optimum for use in flexible packaging. It is to be further noted that the polymer coatings can be extrusion coated onto the paper substrate in either monolayer (i.e., a single layer containing a single polymer type or blend of multiple types of polymers) or in coextrusion multilayers (i.e., 2-14 discrete layers of polymers or blends of polymers). In the case of coextrusion, layer multiplication ("LMT") feedblocks can be used in place of conventional coextrusion feedblocks, in order to increase the number of interfaces between the discrete polymer-coated layers. Paper-based pouches formed in this way can be printed and filled also using conventional equipment designed for use

| Flat Bottom Pouch with Zipper | | | | | | | | | |
|---|---|---|---|---|---|---|---|---|---|
| Size (grams) | Size (ounce) (oz) | Width (mm) | Width (inch) | Length (mm) | Length (inch) | Side Gusset (mm) | Side Gusset (inch) | Bottom Gusset (mm) | Bottom Gusset (inch) |
| 250 | 8 | 140 | 5.5 | 210 | 8.2 | 35 + 35 = 70 | 2.7 | 35 + 35 = 70 | 2.7 |
| 340 | 11 | 140 | 5.5 | 230 | 9 | 35 + 35 = 70 | 2.7 | 35 + 35 = 70 | 2.7 |
| 500 | 16 | 150 | 5.9 | 255 | 10 | 40 + 40 = 80 | 3.1 | 40 + 40 = 80 | 3.1 |
| 1 KG | 32 | 195 | 7.6 | 295 | 11.6 | 47.5 + 47.5 = 95 | 3.5 | 47.5 + 47.5 = 95 | 3.5 |

Flat Bottom Pouches with Zipper

| Flat-Bottom Pouch with Pocket Zipper (Tear Zipper) | | | | | | | | | |
|---|---|---|---|---|---|---|---|---|---|
| Size (grams) | Size (ounce) (oz) | Width (mm) | Width (inch) | Length (mm) | Length (inch) | Side Gusset (mm) | Side Gusset (inch) | Bottom Gusset (mm) | Bottom Gusset (inch) |
| 114 | 4 | 95 | 3.7 | 185 | 7.2 | 30 + 30 = 60 | 2.3 | 30 + 30 = 60 | 2.3 |
| 250 | 8 | 95 | 3.7 | 245 | 9.6 | 35 + 35 = 70 | 2.7 | 35 + 35 = 70 | 2.7 |
| 340 | 11 | 110 | 4.3 | 280 | 11 | 40 + 40 = 80 | 3.1 | 40 + 40 = 80 | 3.1 |
| 500 | 16 | 110 | 4.3 | 300 | 11.8 | 40 + 40 = 80 | 3.1 | 40 + 40 = 80 | 3.1 |
| 1 KG | 32 | 140 | 5.5 | 360 | 14 | 47.5 + 47.5 = 95 | 3.5 | 47.5 + 47.5 = 95 | 3.7 |

Flat-Bottom Pouch with Tear Zipper

Figure 6:
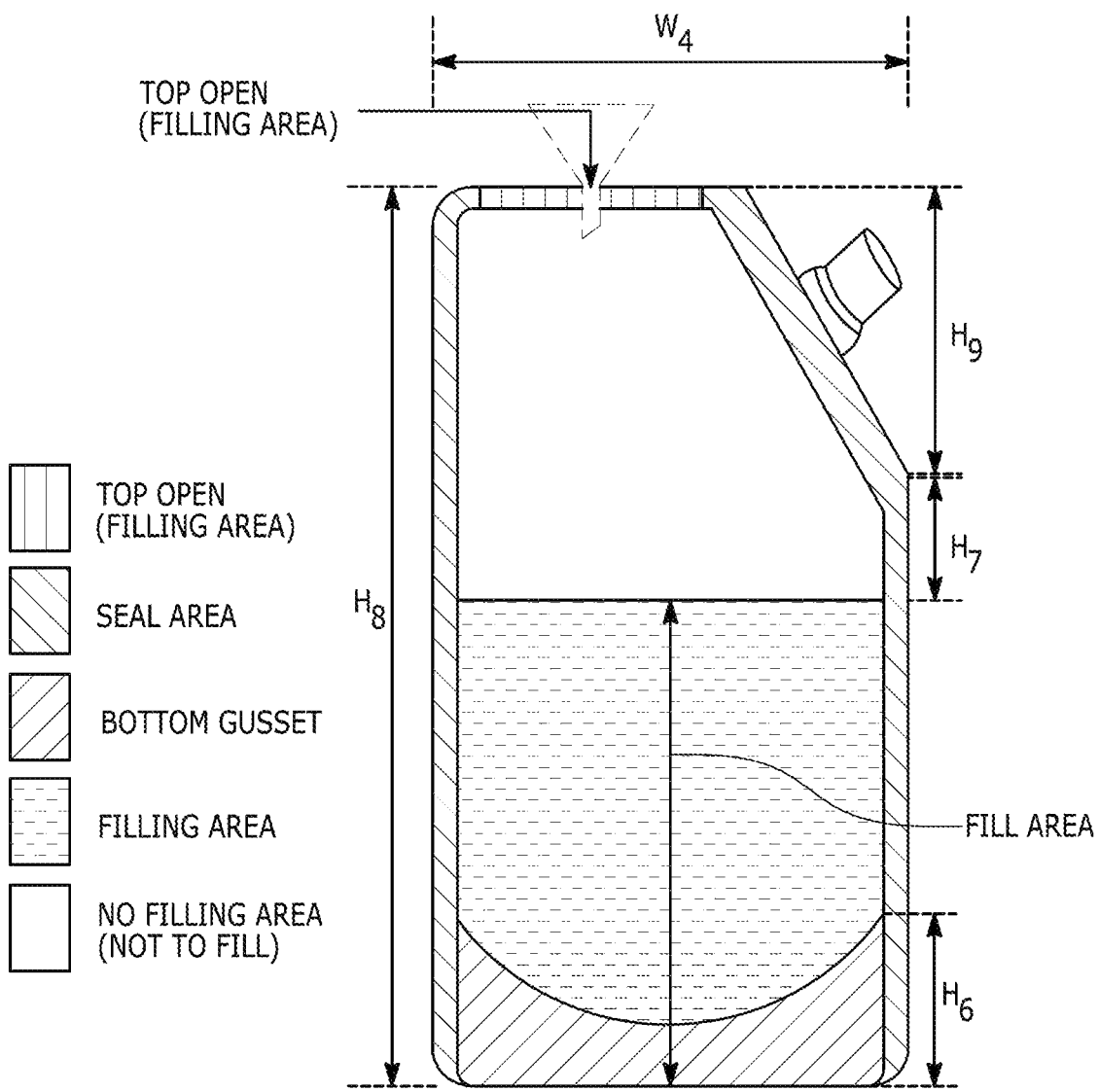
FIG. 6 illustrates a schematic view and table showing dimensions of an embodiment of a multilayer paperboard pouch for holding liquid.

FIG. 6 illustrates a schematic view and table showing dimensions of an embodiment of a multilayer paperboard pouch used primarily for holding liquid. As illustrated in FIG. 6, the multilayer paperboard pouch is formed as a carton comprising a top open filling area for filling the carton with the desired liquid along with seal and a bottom gusset area. The table below illustrates various sizes and weights of an embodiment of a multilayer paperboard carton as shown in FIG. 5 and produced using a CBME running at a normal production speed with multiple plastic laminate materials. By way of example and not limitation, an improved pouch formed by the use of extrusion-coated paper can provide a physical and chemical barrier to be used in place of laminated plastic sheets, thereby providing optimal barrier performance equivalent to commercial plastic pouches.

In other aspects of the present disclosure, paperboard pouches provide preservation of flavors, aromas, nutrients and textures in packaged foods. By way of example and not limitation, further benefits can include protecting foods from microorganisms, odors, flavor scalping, light, oxidation, dehydration or moisture absorption and more efficient blocking of natural and artificial light than provided by conventional plastic packaging materials such as PP, PET or HDPE.

In yet another aspect of the present disclosure, paperboard pouches are made using monolayer extrusion-coated paper. In the depicted embodiment, the paperboard pouches comprise Low Density Polyethylene ("LDPE") with coat weights of 20-29 lbs/3,000 ft$^2$ (i.e., 1.4 to 2.0 mil thick). By way of example and not of limitation, LDPE can be manufactured from both conventional petroleum sources as well as from renewable sources such as sugar cane. In addition, blends of polymers can also be used in monolayer extrusion coating. For example, the following blends of polymers can include LDPE blended with LLDPE (including metallocene catalyzed LLDPE) in amounts of 25-100%/wt. of LLDPE. Blends of LDPE with HDPE (10-50%/wt. of HDPE) or PP (10-50%/wt. of PP) can also be used.

In yet another aspect of the present disclosure, multilayer coextrusion-coated paper used to make the paperboard pouches uses specific barrier resins to provide stronger resistance against oxidation to preserve volatile flavor compounds and thereby prevent the development of odors in the goods packaged in the paperboard pouches. In the depicted embodiment, resins that can provide gas barrier properties to the coated paper substrate include nylons (i.e., polyamides) and EVOH. By way of example and not of limitation, paperboard pouches formed with such barrier resins are coextruded with LDPE (or a blend of LDPE with LLDPE as described previously) and a tie resin to provide compatibility between the layers of barrier resin and LDPE. In the depicted embodiment, paperboard pouches formed with coextruded coatings can comprise from two to 14 discrete layers of polymers having total coat weights of the multilayer coextruded layers in the range of 24-29 lbs/3,000 ft$^2$ (i.e., 1.7 to 2.0 mil thick).

In another aspect of the present disclosure, the paperboard pouches can be laminated with a plastic sheet to provide additional options for printing and forming. For example, a typical plastic sheet would be comprised of PET with a thickness of 0.9-1.2 mil. The plastic sheet is adhered to the paper substrate by extrusion lamination using LDPE or LLDPE as the adhesive layer.

It is to be noted that various embodiments of the invention can comprise single and multilayer paperboard substrates made of either extruded poly and/or poly extrusion combined with a laminate layer, and running at normal production speed on various pouch-forming equipment to produce. It is to be noted that various pouch-forming operation feeds three different or similar webs to form the side walls and gusset—mirroring the above steps—with a few notable exceptions of the bottom being sealed and trimmed.

In another aspect of the present disclosure, a non-extensible substrate for converting paper into flexible packaging (i.e., pouches, bags, etc.) is provided. By way of example and not of limitation, typical use of the substrate includes printing the coated paper substrate, converting the coated paper substrate to paperboard pouches and sealing and filling the pouches using conventional equipment at normal production speeds. Both flat pouches (i.e., without bottom gussets) and pouches with plowed bottom gussets with reclosable zippers and tear slits can be produced.

In the depicted embodiment, the extrusion-coated paper used in the paperboard pouch can be printed by using standard printing presses generally used in the flexible packaging industry. The paper substrate can be printed using conventional printing techniques such as flexographic or gravure printing. Digital printing can also be used. For example, a standard conventional printing press such as OMET VF530 F1 flexographic press can be used. Paperboard pouches can be formed on standard pouch-forming equipment under typical production conditions and speeds despite its being non-extensible. By way of example and not of limitation, standard pouch-forming equipment for use with the invention includes Shanghai Sunshine Flatbed pouch maker (model FSD-600SZ) or Totani Automatic Bag-making Machine (model CT-60DLL SC).

In other aspects of the present disclosure, pouches made from the extrusion-coated paper substrate of the invention can be filled using conventional filling equipment typical to the industry. An example of a representative filler is Leepack model PSG LEE RP8BT-2WD. Pouches made from the extrusion-coated paper substrate of the invention are suitable for packaging dry foodstuffs such as nuts, granola, candy, pet food, snack foods, etc.

It is to be noted that paperboard pouches formed using conventional equipment pass all standard quality control tests including seal integrity, zipper integrity, seal bond pull tests, leak tests, burst failure and tensile tests (as shown in the Examples below).

The Examples below identify the structure and composition of the paper that is used to form the paperboard pouches using conventional pouch-making equipment.

Example 1

Paper with a basis weight of 60 lbs/3,300 ft$^2$ was extrusion coated with 29 lbs/3,000 ft$^2$ of LDPE. The paper was converted into pouches and tested for burst, side seal strength, tensile strength in both MD and CD, Elmendorf tear in both MD and CD, puncture, puncture compressive load and Dart drop. The coated paper was also tested for WVTR.

| | |
|---|---|
| Burst (psi) | 2.7 |
| Side Seal Strength (gf/in) | 2000 |
| Tensile Strength MD (MPa) | 45 |
| Tensile Strength CD (MPa) | 15 |
| Elmendorf MD (grams) | 80 |
| Elmendorf CD (grams) | 94 |
| Puncture (Joules) | 0.004 |
| Puncture Compressive Load (Newtons) | 3.8 |
| Dart Drop (ft-lb) | 0.2 |
| WVTR (g/(m$^2$ · day)) | 5.1 |

Example 2

Paper with a basis weight of 60 lbs/3,300 ft$^2$ was extrusion coated with nylon 6 and bioLDPE in a five-layer coextrusion with a total coat weight of 28 lbs/3,000 ft$^2$. The paper was converted into pouches and tested for the same properties as in Example 1. In addition to testing for WVTR, the paper was also tested for OTR at 0, 50 and 90% RH.

| | |
|---|---|
| Burst (psi) | 4.6 |
| Side Seal Strength (gf/in) | 2800 |
| Tensile Strength MD (MPa) | 39 |
| Tensile Strength CD (MPa) | 15 |
| Elmendorf MD (grams) | 84 |
| Elmendorf CD (grams) | 102 |
| Puncture (Joules) | 0.007 |
| Puncture Compressive Load (Newtons) | 4.1 |
| Dart Drop (ft-lb) | 0.4 |
| WVTR (g/(m$^2$ · day)) | 6.34 |

Example 3

Paper with a basis weight of 60 lbs/3,300 ft² was extrusion coated with a blend of nylon six and amorphous nylon (15% amorphous nylon) and bioLDPE in a five-layer coextrusion with a total coat weight of 28 lbs/3,000 ft². The paper was converted into pouches and tested for the same properties as in Example 2.

| | |
|---|---|
| Burst (psi) | 5.9 |
| Side Seal Strength (gf/in) | 3000 |
| Tensile Strength MD (MPa) | 39 |
| Tensile Strength CD (MPa) | 16 |
| Elmendorf MD (grams) | 86 |
| Elmendorf CD (grams) | 104 |
| Puncture (Joules) | 0.006 |
| Puncture Compressive Load (Newtons) | 4.2 |
| Dart Drop (ft-lb) | 0.6 |
| WVTR (g/(m² · day)) | 6.05 |
| OTR (cc/(m² · day)) 0% RH | 117.7 |
| OTR (cc/(m² · day)) 50% RH | 58.9 |
| OTR (cc/(m² · day)) 90% RH | 58.6 |

Example 4

Paper with a basis weight of 60 lbs/3,300 ft² was extrusion coated with a blend of nylon six and amorphous nylon (75% amorphous nylon) and bioLDPE in a five-layer coextrusion with a total coat weight of 28 lbs/3,000 ft². The paper was converted into pouches and tested for the same properties as in Example 2. Physical properties were similar to those in Example 3.

| | |
|---|---|
| WVTR (g/(m² · day)) | 6.75 |
| OTR (cc/(m² · day)) 0% RH | 112.4 |
| OTR (cc/(m² · day)) 50% RH | 49.2 |
| OTR (cc/(m² · day)) 90% RH | 43.8 |

Example 5

Paper with a basis weight of 60 lbs/3,300 ft² was extrusion coated with amorphous nylon (i.e., 100%) and bioLDPE in a five-layer coextrusion with a total coat weight of 28 lbs/3,000 ft². The paper was converted into pouches and tested for the same properties as in Example 2. Physical properties were similar to those in Example 3.

| | |
|---|---|
| WVTR (g/(m² · day)) | 6.75 |
| OTR (cc/(m² · day)) 0% RH | 91.1 |
| OTR (cc/(m² · day)) 50% RH | 50.4 |
| OTR (cc/(m² · day)) 90% RH | 40.3 |

Example 6

Paper with a basis weight of 60 lbs/3,300 ft² was extrusion coated with adjacent layers of nylon six and EVOH and LDPE in a four-layer coextrusion with a total coat weight of 28 lbs/3,000 ft². The paper was converted into pouches and tested for the same properties as in Example 2. Physical properties were similar to those in Example 3.

| | |
|---|---|
| WVTR (g/(m² · day)) | 3.93 |
| OTR (cc/(m² · day)) 0% RH | 0.47 |
| OTR (cc/(m² · day)) 50% RH | 0.38 |

While the disclosure herein is focused on the use of the invention with a multilayer paperboard pouch, the disclosure is not so limited. Rather, this invention can be used with any system or process that requires an alternating vacuum system, including but not limited to wound therapy systems.

The above-detailed description and the examples described therein have been presented for the purposes of illustration and description only and not by limitation. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of manufacturing a multilayer paperboard pouch using conventional bag-making equipment ("CBME") running at normal production speed for the making of standard plastic bags, the method comprising the steps of:
    providing a feeder for feeding a polymer-coated laminated paper into the CBME;
    moving the polymer-coated laminated paper through the CBME, wherein the front and back sides of the polymer-coated laminated paper are pressed between a set of rollers positioned at a pre-determined distance along the CBME;
    folding the polymer-coated laminated paper and forming one or more gussets in the folded polymer-coated laminated paper; and
    configuring a cutter disposed at a pre-determined location along the CBME to cut the polymer-coated laminated paper having one or more gussets to form a first side portion containing a first side portion gusset, a second side portion containing a second side portion gusset and a bottom portion containing a bottom portion gusset, wherein the first and second side portions are attached to the bottom portion via bottom edges; and
    using a sealer positioned at a pre-determined location along the CBME for sealing the first and second side portions at a top edge to form a multilayer paperboard pouch;
    wherein the polymer is an LDPE polymer blend having a composition of metallocene catalyzed LLDPE in amounts of 25-100%/wt. of LLDPE; and
    wherein the polymer coated paper has a tensile strength of at least 40 MPa and 16 MPa in the machine direction and the cross direction respectively; and
    wherein the finished multilayer paperboard pouch has a burst strength and side seal strength of at least 4.9 psi and 2800 gf/in, respectively; and
    wherein the CBME is further configured to perform the steps of:

folding each of the first and second side portions into halves along a center line extending longitudinally thereof;

connecting a pair of first side edges with each other by the first side portion and a pair of second side edges with each other by the second side portion; and folding the bottom portion into halves along a center line extending longitudinally thereof such that the bottom edges being connected with each other by the bottom portion.

2. The method of claim 1, further comprising extruding a polymer coating onto a paper stock to create the polymer-coated laminated paper.

3. The method of claim 2, wherein the polymer-coated laminated paper is formed by extruding a polymer coating onto a paper stock.

4. The method of claim 1, wherein the polymer-coated laminated paper comprises a single polymer layer.

5. The method of claim 1, wherein the polymer-coated laminated paper comprises a plurality of polymer layers.

6. The method of claim 1, wherein the first side portion is disposed between and extended along the pair of first side edges; and the second side portion is disposed between and extended along the pair of second side edges; and the bottom portion is disposed between and extended along a pair of bottom edges.

7. The method of claim 1, wherein the CBME further comprises a sealer disposed downstream of the feeder for sealing layers of the first and second side portions along said first and second side edges, respectively.

8. The method of claim 1, wherein the multilayer pouch is a flat-bottom pouch having a zipper closure mechanism.

9. The method of claim 1, wherein the multilayer pouch is a flat-bottom pouch with a pocket tear zipper closure mechanism.

10. A method of manufacturing a multilayer paperboard pouch using conventional bag-making equipment ("CBME") running at normal production speed for the making of standard plastic bags, the method comprising the steps of:

providing a feeder for feeding a polymer-coated laminated paper into the CBME;

moving the polymer-coated laminated paper through the CBME, wherein the front and back sides of the polymer-coated laminated paper are pressed between a set of rollers positioned at a pre-determined distance along the CBME;

folding the polymer-coated laminated paper and forming one or more gussets in the folded polymer-coated laminated paper; and configuring a cutter disposed at a pre-determined location along the CBME to cut the polymer-coated laminated paper having one or more gussets to form a first side portion containing a first side portion gusset, a second side portion containing a second side portion gusset and a bottom portion containing a bottom portion gusset, wherein the first and second side portions are attached to the bottom portion via bottom edges; and using a sealer positioned at a pre-determined location along the CBME for sealing the first and second side portions at a top edge to form a multilayer paperboard pouch; and wherein the CBME is further configured for:

loading multiple paperboard pouches;

segregating and opening each individual multilayer paperboard pouch;

filling each individual pouch to a pre-determined weight or volume; and resealing the top of the individual pouch wherein each finished and filled individual pouch has a burst strength and a side seal strength of at least 5.3 psi and 3000 gf/in, respectively.

11. The method of claim 10, wherein the finished pouch is a flat-bottom multilayer pouch without a zipper closure mechanism.

12. A method of manufacturing a multilayer paperboard pouch using conventional bag-making equipment ("CBME") running at normal production speed for the making of standard plastic bags, the method comprising the steps of:

feeding a polymer-coated laminated paper into the CBME;

moving the polymer-coated laminated paper through the CBME, wherein the front and back sides of the polymer-coated laminated paper are pressed between a set of rollers positioned at a pre-determined distance along the CBME;

folding the polymer-coated laminated paper and forming one or more gussets in the folded polymer-coated laminated paper; and cutting the polymer-coated laminated paper at a pre-determined location along the CBME to cut the polymer-coated laminated paper having one or more gussets and form a first side portion containing a first side portion gusset, a second side portion containing a second side portion gusset and a bottom portion containing a bottom portion gusset, wherein the first and second side portions are attached to the bottom portion via bottom edges; and sealing the first and second side portions at a top edge to form a multilayer paperboard pouch; and wherein the CBME is further configured to perform the steps of:

folding each of the first and second side portions into halves along a center line extending longitudinally thereof;

connecting a pair of first side edges with each other by the first side portion and a pair of second side edges with each other by the second side portion; and folding the bottom gusset portion into halves along a center line extending longitudinally thereof such that the bottom edges being connected with each other by the bottom gusset portion.

13. The method of claim 12, further comprising extruding a polymer coating onto a paper stock to create the polymer-coated laminated paper.

14. The method of claim 13, wherein the polymer-coated laminated paper is formed by extruding a polymer coating onto a paper stock.

15. The method of claim 12, wherein the polymer-coated laminated paper comprises a single polymer layer.

16. The method of claim 12, wherein the polymer-coated laminated paper comprises a plurality of polymer layers.

17. The method of claim 12, wherein the polymer is an LDPE polymer blend having a composition of metallocene catalyzed LLDPE in amounts of 25-100%/wt. of LLDPE; and wherein the polymer-coated paper has a tensile strength of at least 40 MPa and 16 MPa in the machine direction and the cross direction, respectively; and wherein the finished multilayer paperboard pouch has a burst strength and side seal strength of at least 4.9 psi and 2,800 gf/in, respectively.

18. The method of claim 12, wherein the first side portion is disposed between and extended along the pair of first side edges; and
the second side portion is disposed between and extended along the pair of second side edges; and
the bottom portion is disposed between and extended along a pair of bottom edges.

19. The method of claim 12, wherein the CBME further comprises a sealer disposed downstream of the feeder for sealing layers of the first and second side portions along said first and second side edges, respectively.

20. The method of claim 12, wherein the polymer-coated paper has a tensile strength of at least 39 MPa and 15 MPa in the machine direction and the cross direction, respectively; and
the finished multilayer paperboard pouch has a burst strength and a side seal strength of at least 5.9 psi and 2,000 gf/in, respectively.

21. A method of manufacturing a multilayer paperboard pouch using conventional bag-making equipment ("CBME") running at normal production speed for the making of standard plastic bags, the method comprising the steps of:
feeding a polymer-coated laminated paper into the CBME;
moving the polymer coated laminated paper through the CBME, wherein the front and back sides of the polymer-coated laminated paper are pressed between a set of rollers positioned at a pre-determined distance along the CBME;
folding the polymer-coated laminated paper and forming one or more gussets in the folded polymer-coated laminated paper; and
cutting the polymer-coated laminated paper at a pre-determined location along the CBME to cut the polymer-coated laminated paper having one or more gussets and form a first side portion containing a first side portion gusset, a second side portion containing a second side portion gusset and a bottom portion containing a bottom portion gusset, wherein the first and second side portions are attached to the bottom portion via bottom edges; and
sealing the first and second side portions at a top edge to form a multilayer paperboard pouch; and
wherein the method further comprising the steps of:
loading multiple paperboard pouches;
segregating and opening each individual multilayer paperboard pouch;
filling each individual pouch to a pre-determined weight or volume; and
resealing the top of the individual pouch wherein each finished and filled individual pouch has a burst strength and a side seal strength of at least 5.3 psi and 3,000 gf/in, respectively.

22. The method of claim 21, wherein the finished pouch is a flat-bottom multilayer pouch without a zipper closure mechanism.

23. The method of claim 21, wherein the multilayer pouch is a flat-bottom pouch having a zipper closure mechanism.

24. The method of claim 21, wherein the multilayer pouch is a flat-bottom pouch with a pocket tear zipper closure mechanism.

* * * * *